Dec. 26, 1961 — F. THOMA — 3,015,054

ELECTRONICALLY CONTROLLED MOTOR

Filed Jan. 11, 1957 — 2 Sheets-Sheet 1

INVENTOR.
Fritz Thoma,
BY
att'y

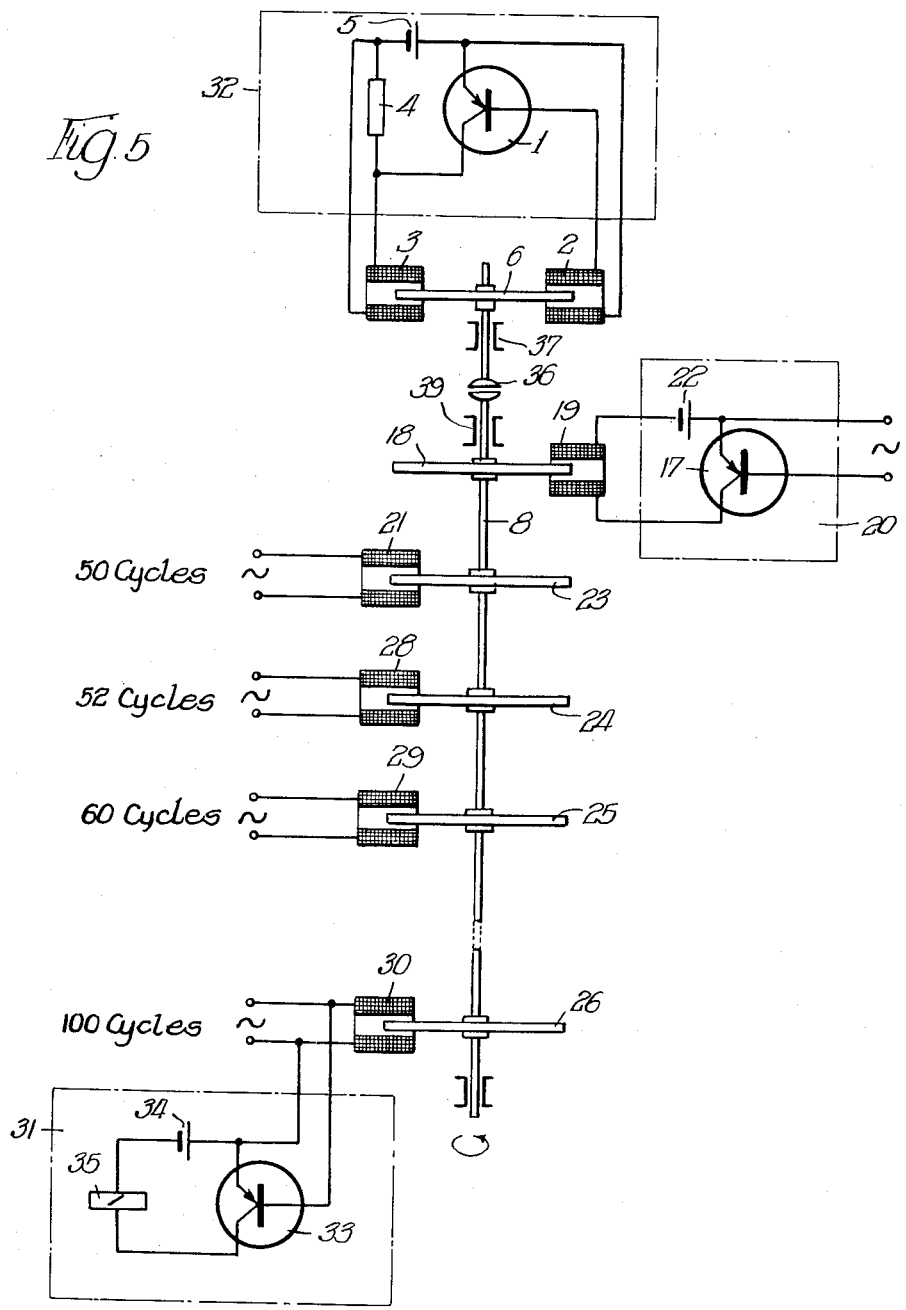

United States Patent Office 3,015,054
Patented Dec. 26, 1961

3,015,054
ELECTRONICALLY CONTROLLED MOTOR
Fritz Thoma, St. Georgen, Black Forest, Germany, assignor to Kieninger & Obergfell, St. Georgen, Black Forest, Germany, a German company
Filed Jan. 11, 1957, Ser. No. 633,701
Claims priority, application Germany Jan. 14, 1956
3 Claims. (Cl. 318—47)

This invention relates to electronic machines and is particularly concerned with an electronic drive for clocks.

The machine according to the invention may be selectively operated as an electric motor or as a generator. The details may be disposed according to the purpose to which the arrangement is put.

The motor according to the invention comprises a permanent magnet in the form of a rod or a rotor, disposed rotatably relative to a plurality of coils in such a manner that a voltage is induced in one of said coils which is connected in the input circuit of a transistor, such voltage affecting the transistor, thereby generating a field in a second coil disposed in the output circuit which affects the magnet rod or rotor in a driving sense operating in the direction of rotation thereof.

The motor according to the invention exhibits a particular feature, namely, that it may also be operated as an alternating current generator, simply by tapping an alternating voltage from the terminals of the output circuit. The frequency of the corresponding alternating voltage is equal to the number of r.p.m. of the rotating magnet rod, being higher, however, in the case of a rotor provided with more than one pair of magnet poles.

In accordance with the invention, the frequency of the alternating current may be stabilized by the provision of a spiral spring upon the drive shaft of the device. The frequency is in this manner determined by the centrifugal mass upon the drive shaft and by the torque of the spiral spring.

The arrangement according to the invention may also be viewed in the nature of a D.C.-A.C. converter by considering that the transistor requires a source of current, namely, direct current.

The various objects and features of the invention will appear from the description which will be rendered below with refernce to the accompanying drawings. In the drawings, FIG. 1 shows a circuit arrangement according to the invention which may be operated selectively as a D.C. motor or as a D.C.-A.C. converter;

FIG. 5 shows an embodiment comprising certain features of the invention.

If the arrangement is to be used as a D.C.-A.C. converter, the battery 5 will supply the required voltage which is to be converted. The frequency is determined by the r.p.m. of a magnet rod 6; higher frequencies may be easily obtained by operating with the same r.p.m. but using in place of the magnet rod 6 a rotor having more than a pair of magnet poles.

Figure 1:
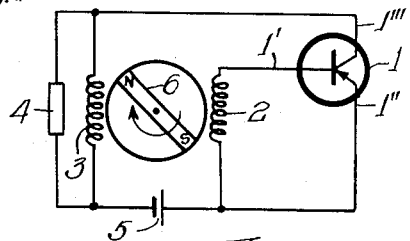

The arrangement according to FIG. 1 may also be operated as a D.C. motor by disposing a permanent magnet made in the form of a rod 6 or in the form of a rotor rotatably relative to a plurality of coils in such a manner that upon rotation of ther od 6 in a predetermined direction, a voltage is induced in the coil 2, which is disposed in the input circuit of a transistor. Such voltage is amplified by the transistor and generates a field in the coil 3 which acts in a driving sense upon the magnet rod or the rotor in the direction of rotation thereof. It is in this connection assumed, of course, that the coils 2 and 3 cooperate in proper manner.

Figure 2:
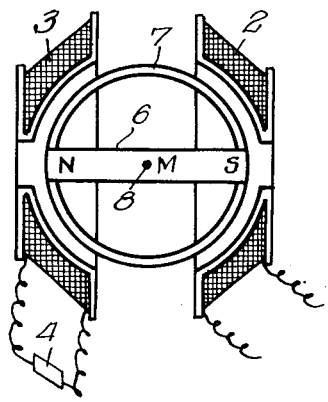
FIG. 2 shows the arrangement of the coils for the device according to FIG. 1.

FIG. 2 shows a particularly favorable arrangement of the coils 2 and 3. These coils are wound and disposed so that they embrace the magnet system 6, being spaced therefrom by the smallest air gap possible. Numeral 7 in FIG. 2 indicates a centrifugal mass made of non-magnetic material such as brass or copper and dimensioned so as to provide at a given voltage of the battery 5 for rotation of the magnet 6 with desired r.p.m.

Figure 3:
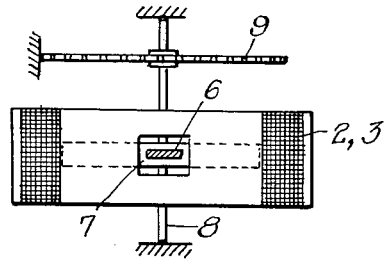
FIG. 3 is another view of the arrangement shown in FIG. 2.

FIG. 3 shows the manner of disposing upon the shaft 8 of the rotating magnet a spiral spring 9. This spring, together with the fly wheel mass 7 determines the mechanical oscillation of the system and therewith the frequency of the voltage at the output. The arrangement provides a mechanical rotating structure with coils from which may be obtained the alternating voltage and constitutes an alternating current source with relatively constant frequency.

The resistor 4 shown in FIG. 1 may be dimensioned so as to counteract the tendency of the transistor to oscillate. In case of using the arrangement as a D.C.-A.C. converter, the resistor 4 will constitute the load and will be connected to the terminals of the coil 3 as shown in FIG. 2.

A particularly important feature of the described arrangement resides in using it as a motor with a mechanical enregy storage means connected in back of the mechanical oscillating system, the storage means in turn driving a clock. This form of the invention accordingly is concerned with an electric clock supplied from a direct current source, comprising a mechanical drive control to which are conducted, by a suitable clutch, periodically effetive driving impulses, from a driving device, and whose working rhythm is affected by the drive control. The drive control is, in this connection, the mechanical oscillating device, described above, which may be provided, for example, with an elastic restoring means. The mechanical oscillating device may be supplied by known transistor feedback circuit means driving the oscillating system (pendulum or balance) which in turn drives the clock mechanism; the arrangement being such that neither contacts nor commutator means are required, and acting upon the coupling or clutch means in such a manner that force is transmitted thereto only at instants of greatest kinetic energy.

Figure 4:
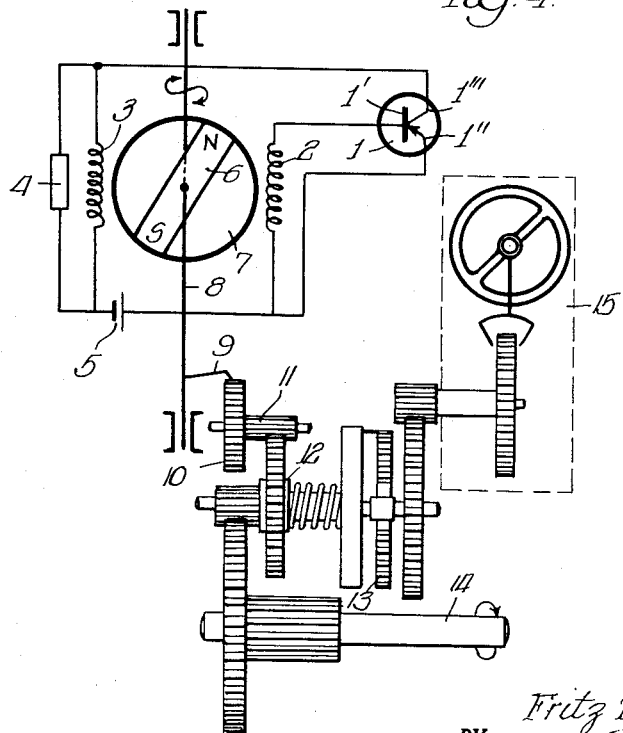
FIG. 4 shows details of the structure.

An example of the above indicated part of the invention is shown in FIG. 4. The reference numerals appearing in these figures correspond to those applied in FIGS. 1 to 3. FIG. 4 shows the arrangement of parts in the case of an electronically controlled clock.

Referring now to FIG. 4, the shaft 8 which carries the magnet rod 6 also controls a pawl 9 for actuating a gear wheel 10 and therewith a pinion 11 meshing with a friction clutch wheel 12 to tension a spring 13 acting as a power storage device. The spring 13 may be made in the form of a spiral spring or in the form of a helical spring. This spring acts with sufficiently constant power on the drive shaft 14 and the balance 15, respectively.

In accordance with the invention, the described device may be further improved by coupling the rotor of the D.C. motor—which is driven from a transistor circuit or another semiconductor circuit, for example, a double-base diode arrangement—with at least one other substantially similar rotor so as to affect either the torque or the frequency of the drive shaft.

In accordance with a particular embodiment of the invention, at least two similar rotors are disposed on one and the same shaft of the D.C. motor or converter device, respectively. These rotors are made in the form of magnet rods or rotors provided with poles, each having allotted thereto at least one suitably dimensioned magnet coil. By proper dimensioning and interconnecting the individual coils, it is in accordance with the invention possible, to provide more turns for the motor coil arrangement disposed in the output circuit of the semiconductor device and driving the mechanical rotary part, than on the coil arrangement which is disposed in the input side of the switching or amplifier arrangement, respectively, and in which is induced a voltage by the operation of the rotating part. The corresponding arrangement increases the output of the apparatus and therewith the torque of the drive shaft of the motor or the electromotive power in the output of the D.C.-A.C. converter.

By using a total of three rotors with respectively accurately similar symmetric pairs of coils it is possible, to connect, for example, one coil as a generator coil and the remaining coils as motor coils. There are for each rotor initially provided two or more similar coils symmetrically disposed, and having terminals that may be interconnected as desired.

It is furthermore contemplated to arrange the shafts of the various rotors so that they may be removably joined or coupled or otherwise mounted for operation in common, so as to provide in this manner aggregates composed of desired numbers of units.

It is in accordance with another feature of the invention possible to control the frequency of a D.C. motor and especially to stabilize it by coupling its rotor for synchronization with at least one other rotor, for example, a rotor of a synchronous motor. The synchronous motor may in such a case determine the frequency of the D.C. motor or the latter may operate as a starter therefor which is automatically disconnected at the instant when the synchronous motor attains its synchronous speed.

The arrangement according to the invention may in accordance with still another feature be made so as to operate as frequency divider or as a frequency multiplier, preferably within a frequency range below 1000 cycles, by addition of further rotors coupled to the same shaft. According to the invention, this may be done by connecting to the drive shaft rotors having different numbers of poles. From the coils allotted to the rotors may be obtained electric currents or voltages of the desired frequencies. Desired frequency division may be obtained by utilizing intermediate frequencies of two or more rotors. Several sets of rotors for different frequency spectrums corresponding to the respectively intended use may be provided for an aggregate formed by a D.C. motor and frequency stabilizer. The desired frequencies with sufficient current and voltage values may be obtained by applying in the arrangement additional rotors for for increasing the output as explained before.

The above indicated part of the invention is schematically indicated in FIG. 5. At 6 is shown a rotor which is disposed upon a shaft 8 for rotation with respect to two coils 2 and 3. The coil 2 is connected in the input circuit of the transistor 1 and serves as a generator coil in which voltage impulses are produced by induction due to rotation of the rotor 6. These impulses control the transistor which thus permits corresponding pulses to flow from battery 5 acting as an energy source. The current impulses generate in the motor coil 3 a magnetic field for driving the rotor 6. A resistor 4 is disposed in parallel to the coil 3 for suppressing the tendency of the transistor to oscillate.

In accordance with the invention, there is provided another rotor 18 on the shaft 8 which has the same number of poles as the rotor 6 or is otherwise in a corresponding ratio thereto, the rotor 18 serving for the synchronization of the rotor 6. The rotor 18 is driven by a coil 19 which is excited by an A.C. generator 20 comprising a transistor 17 biased by a D.C. source 22 and supplied from a suitable A.C. source. The shaft 8 is by the cooperation of the rotors 6 and 18 rotated with a frequency that is stabilized by the generator 20. The torque of the shaft is essentially determined by the transistor arrangement 32.

In view of the relatively high torque of the shaft 8, it is possible to arrange thereon further rotors 23, 24, 25 and 26, such rotors having different numbers of poles; accordingly, alternating voltages with frequencies of 50—52—60 and 100 cycles, respectively, may be obtained at the terminals of the corresponding coils 27, 28, 29 and 30.

The arrangement according to the invention permits production of all conceivable normal frequencies by suitably coupling thereto additional rotors. The output capacity of the arrangement may be dimensioned as desired for all practical applications by connecting to the transistor 1 additional coil combinations respectively coacting with rotors similar to the rotor 6.

An aggregate 31 may be connected to the coil 30, serving for purposes of control, remote transmission and the like. This aggregate may be analogous to the arrangement shown at 32, comprising an amplifying and/or switching transistor 33, a voltage source 34 and a relay 35. Numeral 36 indicates a clutch that may be provided if desired, requiring, however, an additional bearing or journal 39.

The term "rotor" as used herein, unless otherwise specified, is intended to embrace magnet rods as well as rotors proper having poles or pole shoes extending therefrom.

Changes may be made within the scope and spirit of the appended claims.

I claim:

1. An electrical machine comprising a transistor, a plurality of coil means respectively disposed in the input and output circuit of said transistor, rotor means disposed for rotation between said coil means, voltage incident to rotation of said rotor means being induced in the coil means disposed in the input circuit of said transistor and a field being generated in the coil means disposed in the output circuit thereof which acts in a driving sense upon said rotor means, a resistor connected in parallel with one of said coil means for suppressing the tendency of said transistor to oscillate, a second substantially similar rotor means operatively connected to said first rotor for rotation therewith, separate coil means for said second rotor means, and means for applying control pulses to said last mentioned coil means whereby said second rotor means determines the frequency of said first rotor means.

2. An arrangement and cooperation of parts according to claim 1, comprising at least one additional rotor having a number of poles different from that of said first and second named rotors, a generator coil for induction coaction with said additional rotor, said generator coil acting as a frequency transmitter.

3. An arrangement and cooperation of parts according to claim 2, comprising at least two rotor means producing frequencies utilized for frequency division.

References Cited in the file of this patent

UNITED STATES PATENTS

| 1,481,905 | Huey | Jan. 29, 1924 |
| 1,753,331 | Clokey | Apr. 8, 1930 |
| 2,556,296 | Rack | June 12, 1951 |
| 2,564,636 | Bennett et al. | Aug. 14, 1951 |
| 2,598,912 | Held | June 3, 1952 |
| 2,631,423 | Sullivan et al. | Mar. 17, 1953 |
| 2,644,293 | Black | July 7, 1953 |
| 2,644,892 | Gehman | July 7, 1953 |
| 2,719,944 | Brailsford | Oct. 4, 1955 |

(Other references on following page)

UNITED STATES PATENTS

| | | |
|---|---|---|
| 2,753,501 | Brailsford | July 3, 1956 |
| 2,758,206 | Hamilton | Aug. 7, 1956 |
| 2,769,946 | Brialsford | Nov. 6, 1956 |
| 2,829,324 | Sargeant | Apr. 1, 1958 |
| 2,831,114 | Van Overbeek | Apr. 15, 1958 |
| 2,867,762 | Lehman et al. | Jan. 6, 1959 |
| 2,895,095 | Guyton | July 14, 1959 |

FOREIGN PATENTS

| | | |
|---|---|---|
| 1,090,564 | France | Oct. 20, 1954 |
| 1,092,411 | France | Nov. 10, 1954 |